(12) United States Patent
Watanabe et al.

(10) Patent No.: US 11,377,134 B2
(45) Date of Patent: Jul. 5, 2022

(54) STEERING DEVICE

(71) Applicant: JTEKT CORPORATION, Osaka (JP)

(72) Inventors: Takeshi Watanabe, Kashihara (JP); Kunihiro Oka, Kashihara (JP); Yasuyuki Nozawa, Kashihara (JP); Kei Kitahara, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/229,254

(22) Filed: Apr. 13, 2021

(65) Prior Publication Data
US 2021/0323598 A1 Oct. 21, 2021

(30) Foreign Application Priority Data

Apr. 15, 2020 (JP) ............................. JP2020-072891

(51) Int. Cl.
*B62D 1/181* (2006.01)
*B62D 1/19* (2006.01)
(52) U.S. Cl.
CPC ............. *B62D 1/181* (2013.01); *B62D 1/195* (2013.01)
(58) Field of Classification Search
CPC ......... B62D 1/181; B62D 1/195; B62D 1/183
See application file for complete search history.

(56) References Cited

U.S. PATENT DOCUMENTS

| | | | | |
|---|---|---|---|---|
| 5,178,411 A * | 1/1993 | Fevre | ..................... | B62D 1/181 280/775 |
| 5,590,565 A * | 1/1997 | Palfenier | ................ | B62D 1/181 74/493 |
| 5,957,613 A * | 9/1999 | Ruth | ...................... | B62D 1/181 403/48 |
| 2017/0334452 A1 | 11/2017 | Abe et al. | | |
| 2017/0361863 A1 * | 12/2017 | Rouleau | ................. | B62D 1/185 |
| 2019/0210633 A1 | 7/2019 | Derocher et al. | | |
| 2020/0339178 A1 * | 10/2020 | Toyoda | .................... | B62D 1/19 |

FOREIGN PATENT DOCUMENTS

| | | |
|---|---|---|
| EP | 3 517 404 A1 | 7/2019 |
| JP | 2017-206153 A | 11/2017 |

OTHER PUBLICATIONS

Sep. 29, 2021 extended Search Report issued in European Patent Application No. 21168098.8.

* cited by examiner

*Primary Examiner* — Drew J Brown
(74) *Attorney, Agent, or Firm* — Oliff PLC

(57) ABSTRACT

A steering device includes: a first moving unit that moves in an axial direction along with a shaft member to which an operating member is connected; a second moving unit; a holding unit; a first screw mechanism; a second screw mechanism; a driving unit; and a transmission mechanism that transmits driving force of the driving unit to the first screw mechanism and the second screw mechanism. One of the first screw mechanism and the second screw mechanism is provided so as to operate in a forward direction when the operating member moves between a retraction region and an operation region, and reverse efficiency of that one screw mechanism is set such that when the operating member is subjected to an external force directed toward the retraction region, that one screw mechanism does not operate in a reverse direction.

8 Claims, 7 Drawing Sheets

STEERING DEVICE

CROSS-REFERENCE TO RELATED APPLICATION

This application claims priority to Japanese Patent Application No. 2020-072891 filed on Apr. 15, 2020, incorporated herein by reference in its entirety.

BACKGROUND

1. Technical Field

The present disclosure relates to a steering device that can move an operating member, such as a steering wheel, to thereby expand a space in front of a driver.

2. Description of Related Art

At Level 3 or higher of driving automation at which the system assumes full responsibility in autonomous driving of a vehicle, the driver need not be in charge of operation of the vehicle and therefore need not hold an operating member, such as a steering wheel. A technique of moving an operating member and securing a large space in front of a driver to enhance the driver's comfort during autonomous driving is disclosed, for example, in Japanese Patent Application Publication No. 2017-206153.

SUMMARY

A steering device like the aforementioned one that can retract an operating member requires a lock mechanism to lock the movement of the operating member. However, providing a dedicated lock mechanism would complicate the device accordingly.

The present disclosure provides a steering device that can lock the movement of an operating member without being overly complicated.

A steering device according to a first aspect of the present disclosure includes: an operating member that steers a vehicle; a first moving unit that moves in an axial direction of a shaft member having the operating member connected at a rear end, along with the shaft member, and rotatably supports the shaft member; a second moving unit that holds the first moving unit so as to be movable in the axial direction; a holding unit that holds the second moving unit so as to be movable in the axial direction; a first screw mechanism that is disposed between the first moving unit and the second moving unit and moves the first moving unit in the axial direction; a second screw mechanism that is disposed between the second moving unit and the holding unit and moves the second moving unit in the axial direction; a driving unit that outputs driving force for driving the first screw mechanism and the second screw mechanism; and a transmission mechanism that is coupled to the first screw mechanism, the second screw mechanism, and the driving unit and transmits driving force of the driving unit to the first screw mechanism and the second screw mechanism. The steering device moves the operating member between an operation region and a retraction region. One of the first screw mechanism and the second screw mechanism is provided so as to operate in a forward direction when the operating member moves between the retraction region and the operation region, and the reverse efficiency of that one screw mechanism is set such that when the operating member is subjected to an external force directed toward the retraction region, that one screw mechanism does not operate in a reverse direction due to the external force.

A steering device according to a second aspect of the present disclosure includes: an operating member that steers a vehicle; a first moving unit that moves in an axial direction of a shaft member having the operating member connected at a rear end, along with the shaft member, and rotatably supports the shaft member; a second moving unit that holds the first moving unit so as to be movable in the axial direction; a holding unit that holds the second moving unit so as to be movable in the axial direction; a first screw mechanism that is disposed between the first moving unit and the second moving unit and moves the first moving unit in the axial direction; a second screw mechanism that is disposed between the second moving unit and the holding unit and moves the second moving unit in the axial direction; a first driving unit that outputs driving force for driving the first screw mechanism; and a second driving unit that outputs driving force for driving the second screw mechanism. The steering device moves the operating member between an operation region and a retraction region. Each of the first screw mechanism and the second screw mechanism is provided so as to operate in a forward direction when the operating member moves between the retraction region and the operation region, and the reverse efficiency of each of the first screw mechanism and the second screw mechanism is set such that when the operating member is subjected to an external force directed toward the retraction region, each of the first screw mechanism and the second screw mechanism does not operate in a reverse direction due to the external force.

The present disclosure can provide a steering device that can lock the movement of an operating member without being overly complicated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
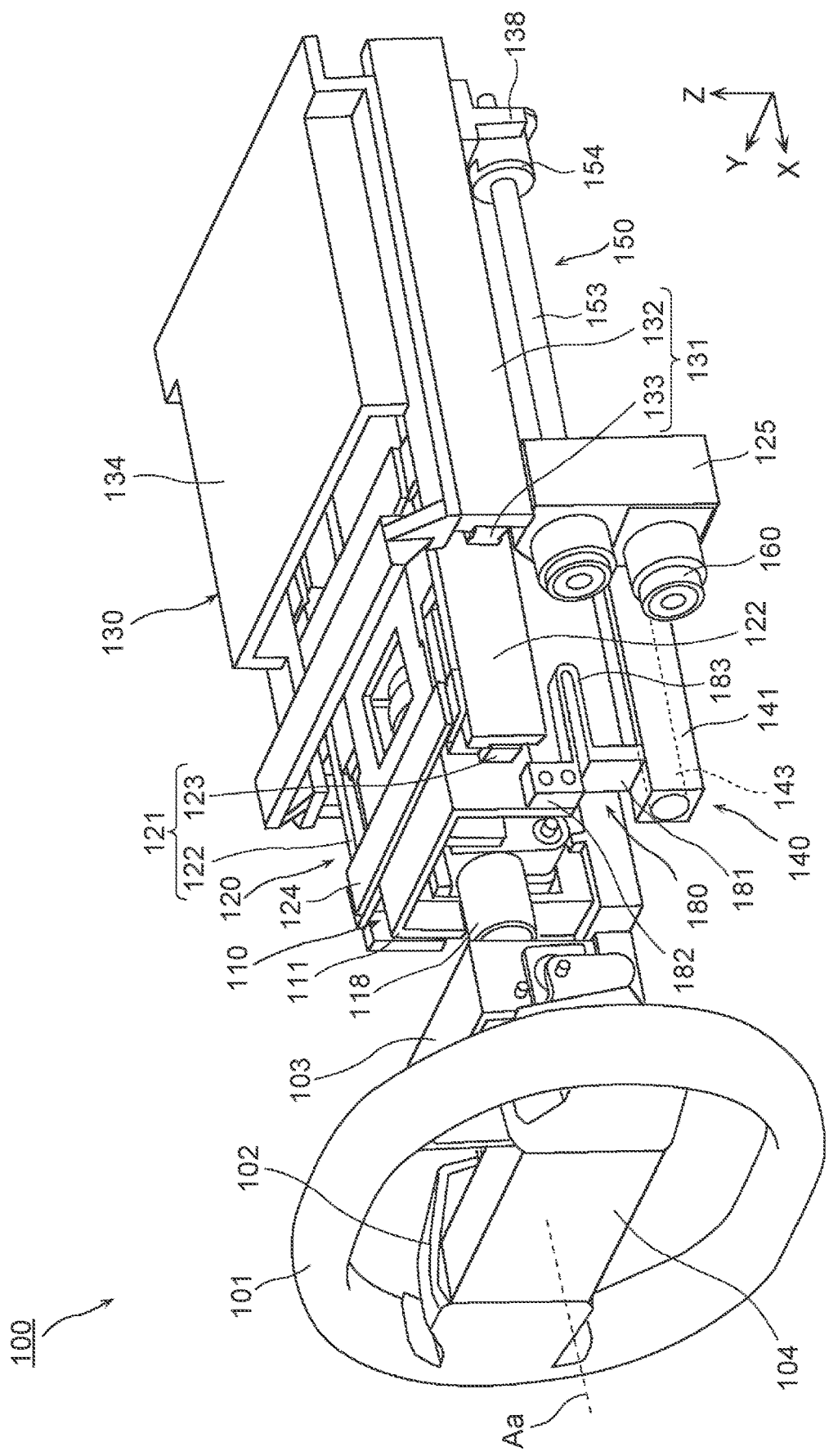
FIG. 1 is a perspective view showing an external appearance of a steering device according to an embodiment.

An embodiment of a steering device according to the present disclosure and a modified example thereof will be specifically described below with reference to the drawings. Each of the embodiment and the modified example described below represents a comprehensive or specific example. The numerical values, shapes, materials, constituent elements, positions of arrangement and forms of connection of the constituent elements, steps and the order of the steps, etc. shown in the following embodiment and modified example are examples and not intended to limit the present disclosure. Those of the constituent elements in the following embodiment and modified example that are not described in the independent claims will be described as optional constituent elements.

The drawings are schematic views in which some parts are exaggerated, omitted, or adjusted in proportion as necessary to show the present disclosure, and the shapes, positional relationships, and proportions in the drawings may differ from actual ones. Further, when an expression showing a relative direction or a posture, such as "parallel" or "orthogonal," is used in the following embodiment, it also covers a direction or a posture that is not exactly that direction or posture. For example, that two directions are parallel to each other does not only mean that these two directions are perfectly parallel to each other, but also covers a case where these two directions are substantially parallel to each other, i.e., with about a few percent error, for example.

Embodiment

Figure 2:
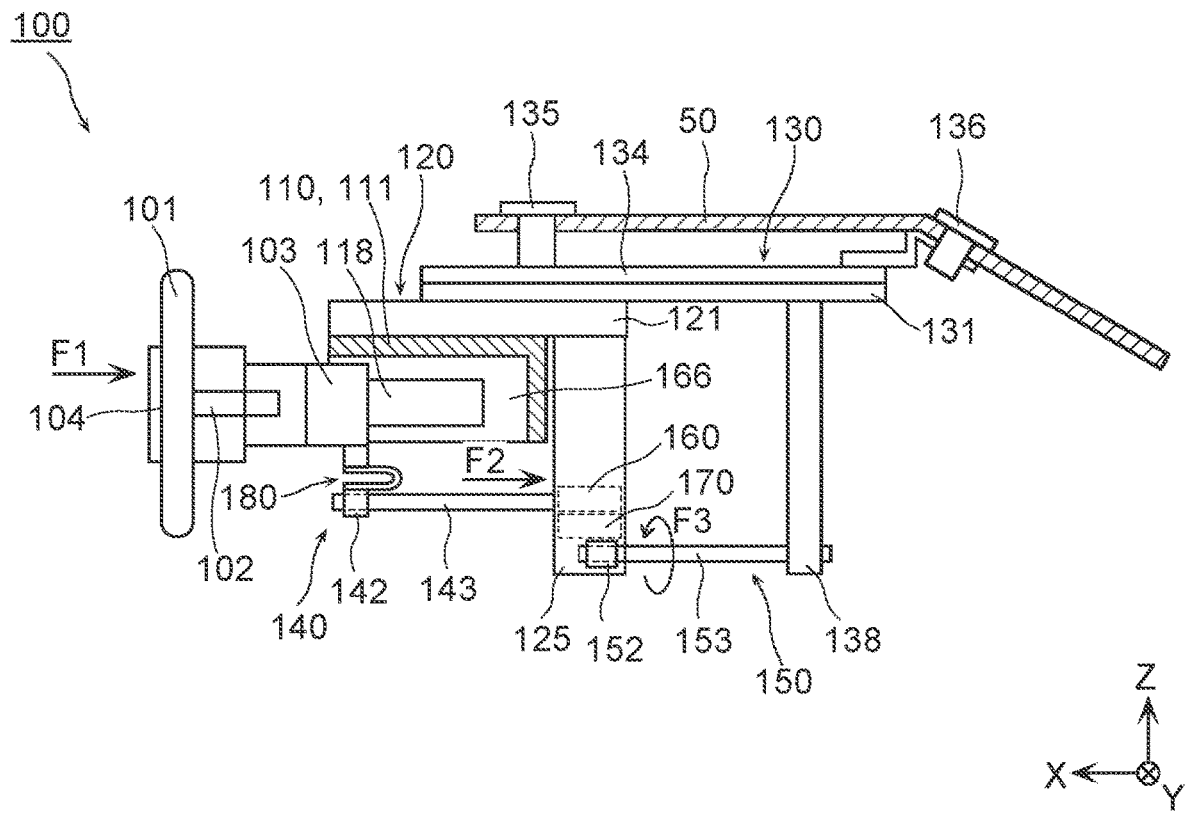
FIG. 2 is a view schematically showing the structure of the steering device according to the embodiment.

First, an overview of the configuration and the operation of a steering device 100 according to the embodiment will be described. FIG. 1 is a perspective view showing an external appearance of the steering device 100 according to the embodiment. FIG. 2 is a view schematically showing the structure of the steering device 100 according to the embodiment. In FIG. 2, parts of the steering device 100 are schematically shown for clarity, with their positional relationships changed from those in FIG. 1 and depiction of some members omitted.

The steering device 100 according to this embodiment is a device that is, for example, installed in a vehicle, such as an automobile, bus, truck, construction machine, or agricultural machine, that can switch between manual driving and autonomous driving. The steering device 100 also has a function of moving an operating member 101, used to steer the vehicle, between an operation region and a retraction region.

Specifically, as shown in FIG. 1 and FIG. 2, the steering device 100 includes the operating member 101, a first moving unit 110, a second moving unit 120, a holding unit 130, a first screw mechanism 140, a second screw mechanism 150, a driving unit 160, and a transmission mechanism 170.

The operating member 101 is, for example, an annular member called a steering wheel, and is connected at a rear end of a shaft member 118. Specifically, the operating member 101 is connected to an operation support part 103 through a support member 102. The operation support part 103 is a member that rotates as the operating member 101 is rotated by a driver's operation, and is a member interposed between the operating member 101 and the shaft member 118. Thus, the shaft member 118 is connected to the operating member 101 through the operation support part 103, and rotation of the operating member 101 around a steering axis Aa is transmitted to the shaft member 118 through the operation support part 103. Alternatively, the operating member 101 may be directly fixed to the shaft member 118.

In FIG. 1, an axial direction of the shaft member 118 (a direction parallel to the steering axis Aa) corresponds to an X-axis direction, and frontward in the steering device 100 is frontward in the vehicle in which the steering device 100 is installed and is an X-axis minus direction. Rearward in the steering device 100 is a direction opposite from frontward and is an X-axis plus direction. In FIG. 1, the steering axis Aa that is a rotational axis of the shaft member 118 is indicated by a dashed line. Hereinafter, the term "axial direction" used alone means an axial direction of the shaft member 118 (i.e., a direction parallel to the steering axis Aa). In this embodiment, the axial direction and a front-rear direction correspond to each other.

The operating member 101 is rotated around the steering axis Aa by the driver's operation, and one or more tires of the vehicle are turned based on the amount of this rotation etc. Specifically, the steering device 100 is a device that is incorporated into a so-called steer-by-wire system, and the operating member 101 and the tires are not mechanically connected to each other. A turning motor drives one or more tires based on information showing a steering angle of the operating member 101 etc. that is output from the steering device 100. While the steering device 100 also includes a reaction force device that applies to the operating member 101 a torque that opposes a force applied by the driver, depiction and description of this device will be omitted.

In this embodiment, an airbag housing part 104 is fixed on the driver's side (an X-axis plus side) of the operation support part 103, and when the operating member 101 is seen from the driver's side, the airbag housing part 104 is located at a central part of the operating member 101. An airbag (see FIG. 9) is housed in the airbag housing part 104 in a deployable manner, and an airbag 200 deploys by pushing and breaking through the airbag housing part 104, for example, in the event of a collision of the vehicle.

The first moving unit 110 is a part that moves in the axial direction along with the shaft member 118 and rotatably supports the shaft member 118. Specifically, the first moving unit 110 has a box body 111 that rotatably supports the shaft member 118. The box body 111 houses, for example, a switch for activating a directional indicator.

The second moving unit 120 has a guide mechanism 121 that slides the box body 111 of the first moving unit 110. The guide mechanism 121 includes a pair of rails 122 and a pair of movable parts 123 of which the sliding movement in the axial direction is guided by the rails 122.

The rails 122 are rail bodies that are elongated in the axial direction and hold the movable parts 123 so as to be slidable in the axial direction. The rails 122 are disposed so as to face each other at a predetermined interval in a left-right direction (a Y-axis direction). The movable parts 123 are fixed on left and right outer side surfaces of the box body 111. The box body 111 and the movable parts 123 can slide back and forth in the axial direction by being guided by the rails 122. Thus, the first moving unit 110 is held by the second moving unit 120 so as to be movable in the axial direction.

The pair of rails 122 are coupled together by a coupling member 124. Specifically, the coupling member 124 is a metal plate body that is elongated in the left-right direction, and both ends of the coupling member 124 are fixed on upper ends of the respective rails 122. Thus, the coupling member 124 supports the rails 122 while being suspended between the rails 122. Thus integrating the rails 122 through the coupling member 124 can enhance the rigidity of the rails 122 and the coupling member 124 as a whole. As a result, backlash can be reduced when the first moving unit 110 slides relatively to the second moving unit 120 or when the second moving unit 120 slides relatively to the holding unit 130.

One of the pair of rails 122 (in this embodiment, the rail 122 on a Y-axis minus side) is provided with a frame 125 that holds the driving unit 160 and the transmission mechanism 170. The frame 125 is integrated with the rail 122 and moves along with the rail 122.

The holding unit 130 has a guide mechanism 131 that slides the second moving unit 120 in the axial direction, and a base member 134 that supports the guide mechanism 131.

The guide mechanism 131 includes a pair of rails 132 and a pair of movable parts 133 of which the sliding movement in the axial direction is guided by the rails 132. The rails 132 are rail bodies that are elongated in the axial direction and hold the movable parts 133 so as to be slidable in the axial direction. The rails 132 are disposed so as to face each other at a predetermined interval in the left-right direction. The movable parts 133 are fixed on left and right outer side surfaces of the rails 122. The rails 122 and the movable parts 133 can slide back and forth in the axial direction by being guided by the rails 132. Thus, the second moving unit 120 is held by the holding unit 130 so as to be movable in the axial direction.

The base member 134 couples the pair of rails 132 together. Specifically, the base member 134 is a substantially box-shaped metal member that is open on a lower side. Upper ends of the respective rails 132 are fixed at both ends of the base member 134 in the left-right direction. Thus, the base member 134 supports the rails 132 while being suspended between the rails 132. Thus integrating the rails 132 through the base member 134 can enhance the rigidity of the rails 132 and the base member 134 as a whole. As a result, backlash can be reduced when the first moving unit 110 slides relatively to the second moving unit 120 or when the second moving unit 120 slides relatively to the holding unit 130.

The base member 134 is provided with a first fixing part 135 and a second fixing part 136 that are fixed to a vehicle body 50. The first fixing part 135 is disposed on a rear side relatively to the second fixing part 136, and couples the base member 134 and the vehicle body 50 together to fix the base member 134 to the vehicle body 50. The second fixing part 136 is disposed on a front side relatively to the first fixing part 135, and couples the base member 134 and the vehicle body 50 together to fix the base member 134 to the vehicle body 50.

The structure of the second fixing part 136 has lower rigidity than that of the first fixing part 135. Specifically, the first fixing part 135 is simply a fastening tool such as a bolt, whereas the second fixing part 136 consists of a bent metal plate and a bolt. The base member 134 and the vehicle body 50 are fixed to each other through the second fixing part 136. Since the bent portion in the metal plate is more fragile than the first fixing part 135, in the event of a collision of the front side of the vehicle, the impact of the collision can be absorbed as this fragile portion deforms. Thus, it can be said that the second fixing part 136 has a higher impact-absorbing property than the first fixing part 135. The second fixing part 136 may have any structure that has a higher impact-absorbing property than the structure of the first fixing part 135. Specifically, a portion that is shaped so as to be fragile may be formed as described above, or a fragile portion may be formed by, for example, incorporating an elastic material, such as rubber, as part of the second fixing part.

The first screw mechanism 140 is disposed between the first moving unit 110 and the second moving unit 120 and moves the first moving unit 110 in the axial direction. Specifically, the first screw mechanism 140 has a case body 141, a first nut 142, a sliding screw 143, and a backlash reducing mechanism 144.

Figure 3:
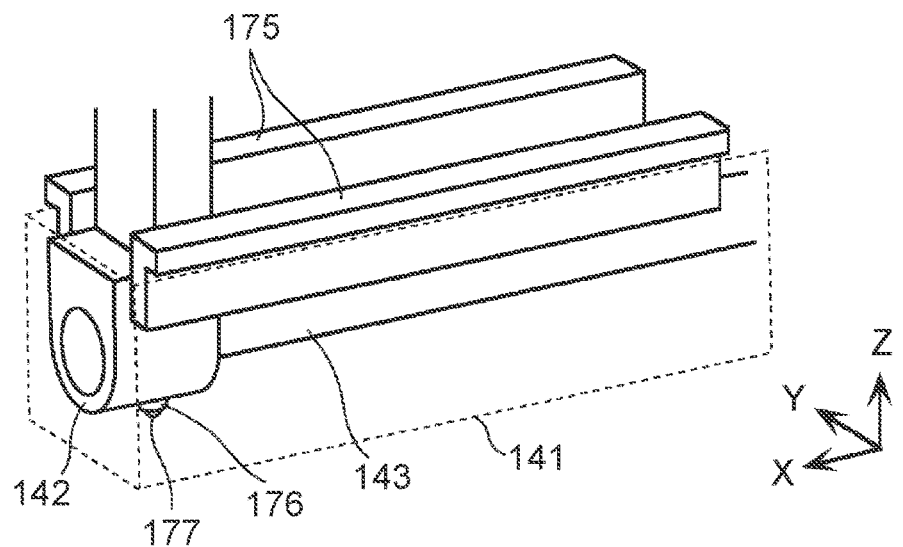
FIG. 3 is a perspective view showing a structure for supporting a first nut on a case body according to the embodiment.

FIG. 3 is a perspective view showing a structure for supporting the first nut 142 on the case body 141 according to the embodiment. In FIG. 3, the outline of the case body 141 is indicated by dashed lines.

As shown in FIG. 3, the case body 141 is a case that houses the sliding screw 143 and, in this state, rotatably holds the sliding screw 143. The case body 141 extends along the axial direction, and the sliding screw 143 is disposed inside the case body 141 so as to lie along the axial direction. The first nut 142 is also housed inside the case body 141, and the sliding screw 143 is screwed in the first nut 142.

The first nut 142 is fixed on the box body 111 of the first moving unit 110 through an impact absorbing member 180 to be described later. The movement of the first nut 142 in the axial direction is guided by a pair of bushes 175. Specifically, the pair of bushes 175 are members that are made of resin and elongated in an X-axis direction. The pair of bushes 175 are held on upper edges of the case body 141 so as to face each other in the Y-axis direction. The first nut 142 is interposed between the pair of bushes 175. The first nut 142 is in contact with inner side surfaces of the respective bushes 175. Thus, the posture of the first nut 142 is stabilized. The inner side surfaces of the respective bushes 175 serve as guide surfaces and guide the movement of the first nut 142 in the axial direction.

A plunger 176 is provided on a lower surface of the first nut 142. The plunger 176 extends in a Z-axis direction, with a ball 177 protruding from a lower end surface thereof in a retractable manner. The ball 177 is urged by a spring, built inside the plunger 176, in a protruding direction. The ball 177 is in contact with an inner bottom surface of the case body 141. Thus, inclination of the first nut 142 can be absorbed by the ball 177, and the posture of the first nut 142 can be thereby stabilized. Further, when the first nut 142 moves in the axial direction, the ball 177 guides the movement of the first nut 142 by rolling over the inner bottom surface of the case body 141.

The sliding screw 143 is disposed along the axial direction inside the case body 141. A front end of the sliding screw 143 is connected to the transmission mechanism 170, while the other end thereof is rotatably supported by the case body 141.

Figure 4:
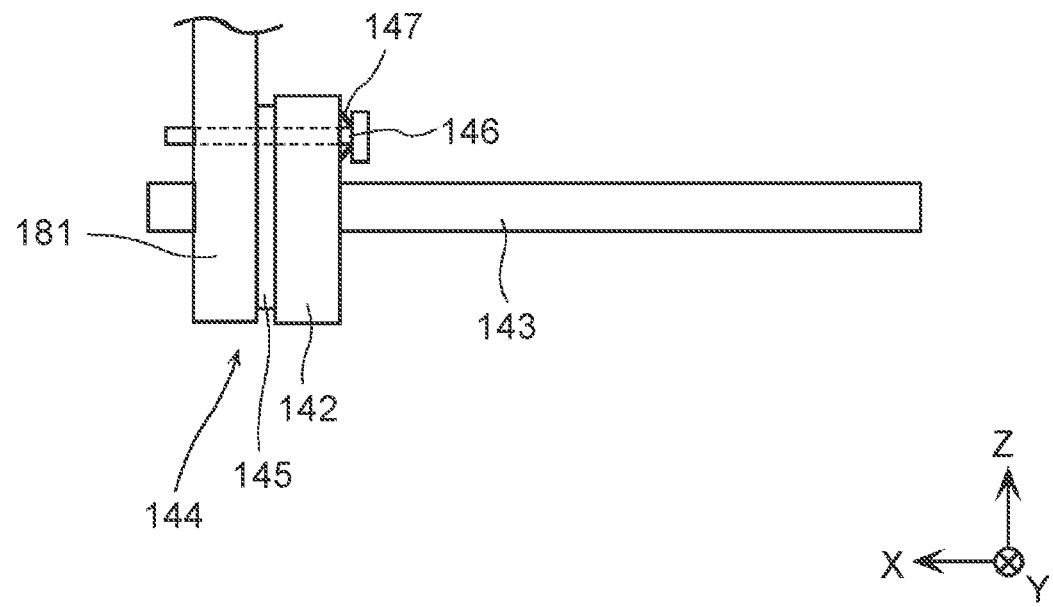
FIG. 4 is a schematic view showing in outline the configuration of a backlash reducing mechanism according to the embodiment.

The backlash reducing mechanism 144 is a part that reduces backlash of the first nut 142 relative to the sliding screw 143. FIG. 4 is a schematic view showing in outline the configuration of the backlash reducing mechanism 144 according to the embodiment. As shown in FIG. 4, the backlash reducing mechanism 144 has an elastic body 145, a fastening part 146, and a washer 147. The elastic body 145 is a rubber member that is disposed between the first nut 142 and an engaging part 181 that is a part of the impact absorbing member 180, and is sandwiched between the first nut 142 and the engaging part 181. The engaging part 181 and the elastic body 145 neither interfere with the sliding screw 143 nor hinder the movement of the first nut 142 relative to the sliding screw 143. The engaging part 181 and the elastic body 145 each have, for example, a hole through which the sliding screw 143 is passed.

The fastening part 146 is a screw body that fastens the engaging part 181 and the first nut 142 together. The fastening part 146 extends through the first nut 142 and the elastic body 145 and, in this state, is screwed on an internal thread formed in the engaging part 181. The washer 147 is a spring washer interposed between the screw head of the fastening part 146 and the first nut 142.

Figure 5:
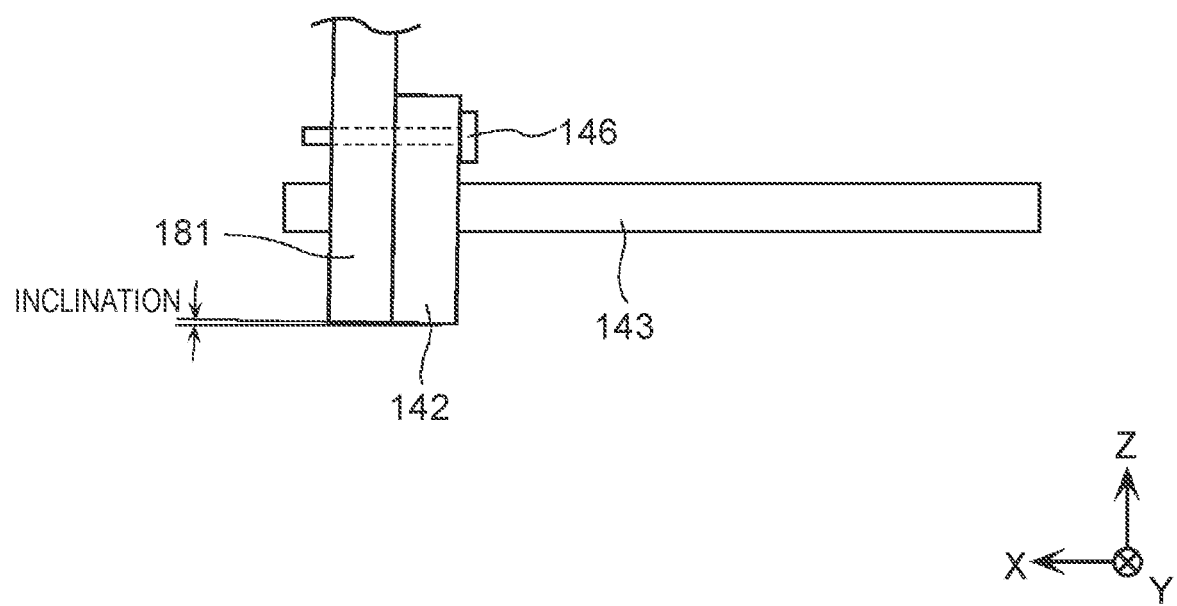
FIG. 5 is a schematic view showing a structure for joining a first nut and an engaging part together according to a comparative example.

FIG. 5 is a schematic view showing a structure for joining the first nut 142 and the engaging part 181 together according to a comparative example. As shown in FIG. 5, the comparative example is different from the embodiment in that the elastic body 145 and the washer 147 are not provided. If the elastic body 145 and the washer 147 are not provided, when the first nut 142 and the engaging part 181 are fastened together by the fastening part 146, the first nut 142 and the engaging part 181 may be fixed in a state of being inclined relatively to the sliding screw 143 due to backlash between the sliding screw 143 and the first nut 142. Specifically, the engaging part 181 and the sliding screw 143 may be inclined due to backlash of the first moving unit 110 on which the engaging part 181 is mounted and backlash of the second moving unit 120 on which the sliding screw 143 is mounted. In this case, when the engaging part 181 and the first nut 142 are fixed, the first nut 142 becomes inclined relatively to the sliding screw 143 (see FIG. 5). This leads to an increase in torque when the first nut 142 and the sliding screw 143 move relatively to each other.

In this embodiment, the posture of the first nut 142 is stabilized by the pair of bushes 175 and the plunger 176, so that backlash of the first nut 142 is reduced.

Further, in this embodiment, the aforementioned inclination is absorbed by the elastic body 145 and the washer 147 as shown in FIG. 4, so that creation of backlash and an increase in torque can be avoided. In particular, in this embodiment, since the washer 147 is provided, the fastening part 146 can be restrained from loosening when permanent deformation of the elastic body 145 occurs. The backlash reducing mechanism 144 illustrated in this embodiment includes the elastic body 145 and the washer 147. However, the backlash reducing mechanism may have any structure that can reduce backlash of the first nut 142 relative to the sliding screw 143. For example, a backlash reducing mechanism including either an elastic body or a washer may be adopted.

The second screw mechanism 150 is disposed between the second moving unit 120 and the holding unit 130 and moves the second moving unit 120 in the axial direction. Specifically, the second screw mechanism 150 includes a second nut 152, a ball screw 153, and an aligning mechanism 154.

The second nut 152 is a member that is rotated by the driving unit 160 and coupled to the transmission mechanism 170. The ball screw 153 is screwed in the second nut 152. A front end of the ball screw 153 is rotatably supported and fixed on one rail 132 (in this embodiment, the rail 132 on the Y-axis minus side) of the holding unit 130. This means that the ball screw 153 is fixed so as not to rotate relatively to the holding unit 130. Specifically, a shaft support part 138 protruding downward is provided at a front end of the rail 132. The front end of the ball screw 153 is coupled to the shaft support part 138 through the aligning mechanism 154.

Figure 6:
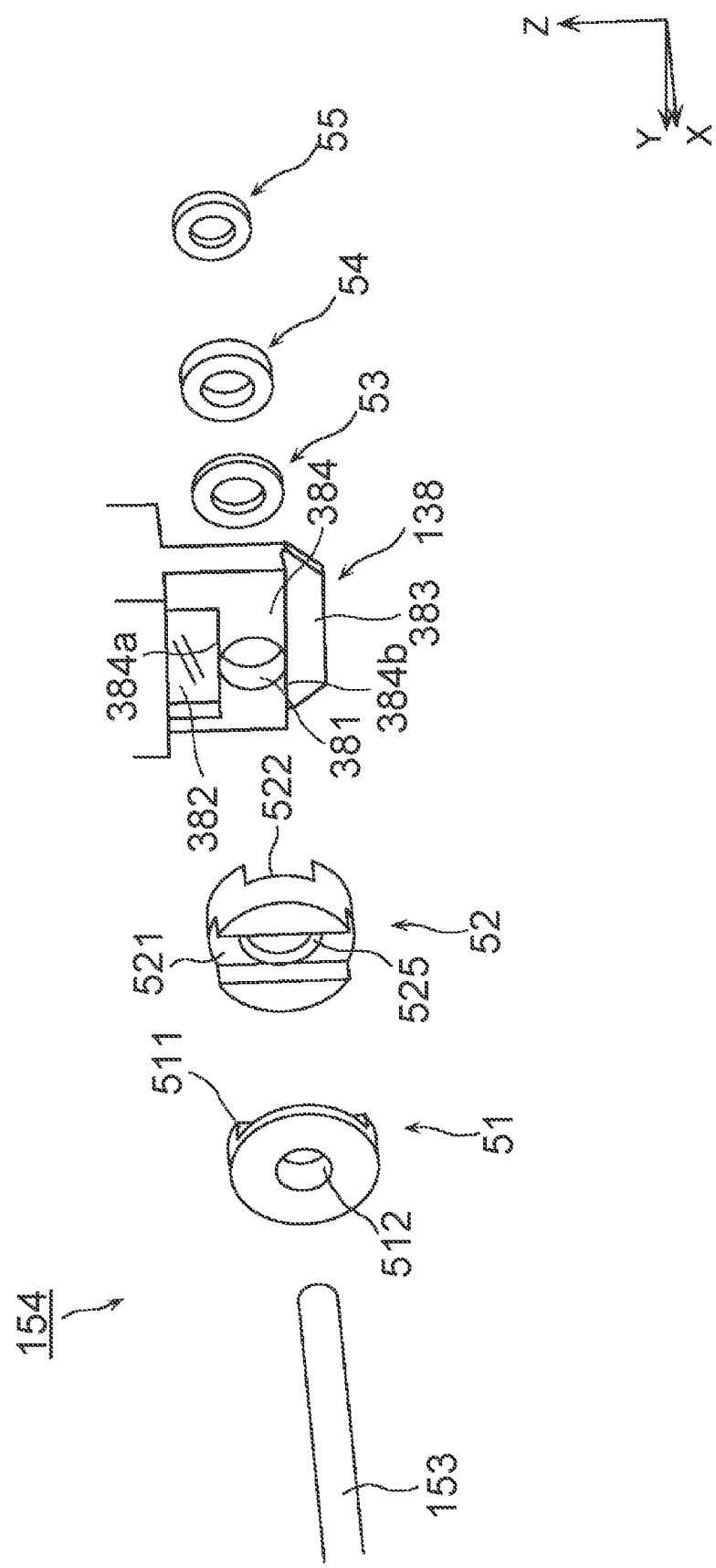
FIG. 6 is an exploded perspective view showing parts of an aligning mechanism according to the embodiment as exploded.
Figure 7:
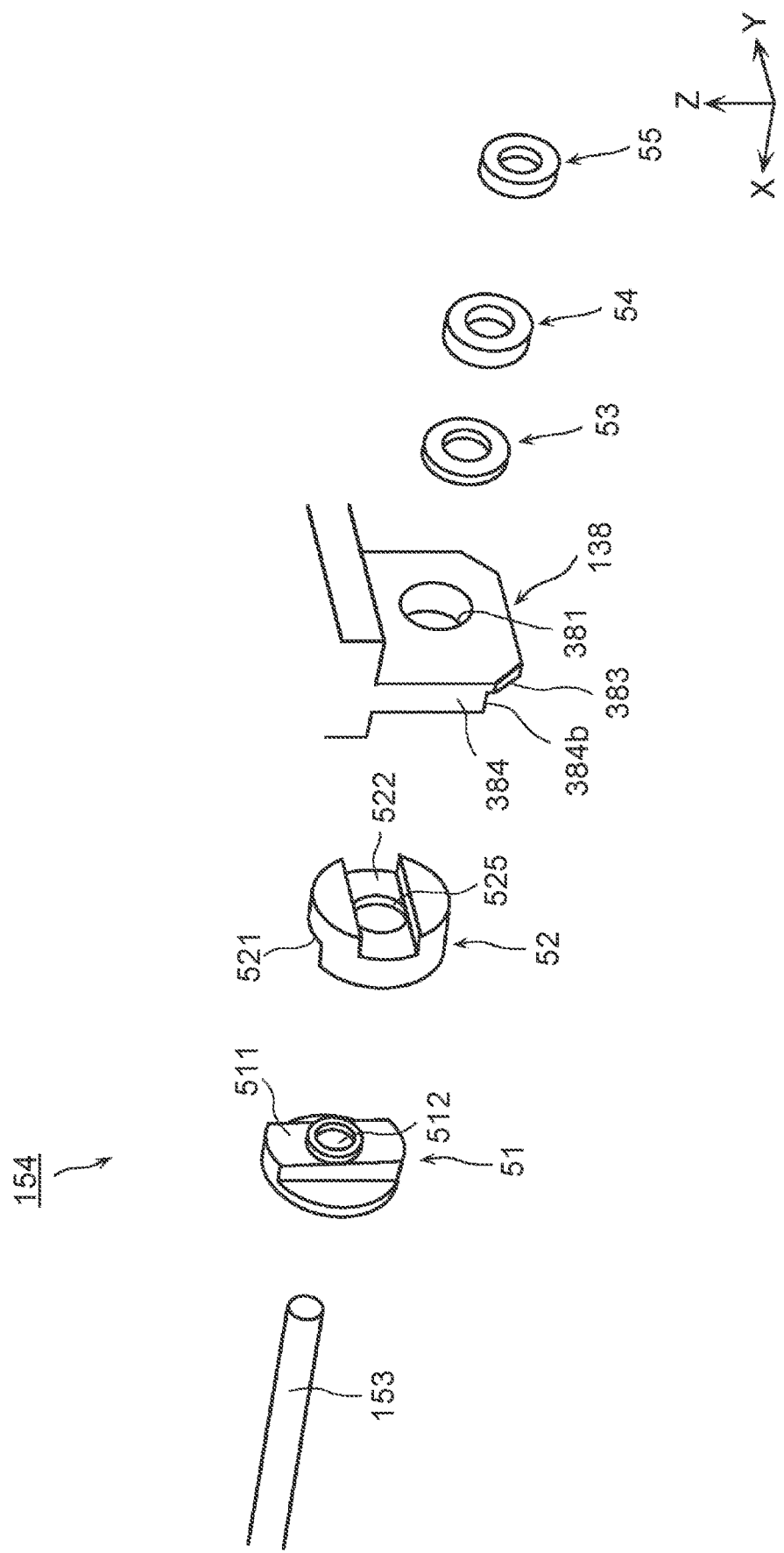
FIG. 7 is an exploded perspective view showing the parts of the aligning mechanism according to the embodiment as exploded.

Here, the aligning mechanism 154 will be described. The aligning mechanism 154 is a mechanism that adjusts the position of the shaft center of the ball screw 153 relative to the second nut 152. FIG. 6 and FIG. 7 are exploded perspective views showing parts of the aligning mechanism 154 according to the embodiment as exploded. Specifically, FIG. 6 is a perspective view of the parts of the aligning mechanism 154 as seen from the rear side, and FIG. 7 is a perspective view of the parts of the aligning mechanism 154 as seen from the front side.

First, the shaft support part 138 will be described. The shaft support part 138 has a through-hole 381 through which the front end of the ball screw 153 extends. As shown in FIG. 7, a front surface of the shaft support part 138 is a plane surface parallel to a YZ-plane. On the other hand, as shown in FIG. 6, a rear surface of the shaft support part 138 has a pair of recesses 382, 383 formed one on each side of the through-hole 381 in an up-down direction. The recess 382 is disposed on an upper side of the through-hole 381 and depressed in a rectangular shape elongated in the Y-axis direction. The recess 383 is disposed on a lower side of the through-hole 381 and is a notch elongated in the Y-axis direction. A portion between the pair of recesses 382, 383 will be referred to as a base portion 384. The base portion 384 has a shape elongated in the Y-axis direction, and an upper surface 384a and a lower surface 384b thereof are plane surfaces parallel to an XY-plane. The upper surface 384a and the lower surface 384b contribute to adjusting the position of the shaft center of the ball screw 153. Thus, the shaft support part 138 is a part of the aligning mechanism 154.

Next, the aligning mechanism 154 will be described in detail. As shown in FIG. 6 and FIG. 7, the aligning mechanism 154 includes, in addition to the shaft support part 138, a first aligning member 51, a second aligning member 52, a first washer 53, a second washer 54, and a nut 55.

The first aligning member 51 is a substantially ring-shaped member. A protrusion 511 elongated in the Z-axis direction is formed on a front surface of the first aligning member 51. A pair of outer side surfaces of the protrusion 511 are plane surfaces parallel to an XZ-plane. The protrusion 511 extends so as to pass through a central part of the first aligning member 51. A through-hole 512 through which the front end of the ball screw 153 extends is formed at the central part of the first aligning member 51. The through-hole 512 is located inside the protrusion 511. At a predetermined position in the front end of the ball screw 153 extending through the through-hole 512, the movement of the first aligning member 51 in the axial direction relative to the ball screw 153 is restricted.

The second aligning member 52 is a substantially ring-shaped member. A first recess 521 elongated in the Z-axis direction is formed in a rear surface of the second aligning member 52. The first recess 521 extends so as to pass through a central part of the second aligning member 52. A through-hole 525 through which the front end of the ball screw 153 extends is formed at the central part of the second aligning member 52. The through-hole 525 is located inside the first recess 521. A pair of inner side surfaces of the first recess 521 are plane surfaces parallel to the XZ-plane. The protrusion 511 of the first aligning member 51 is fitted in the first recess 521. The pair of outer side surfaces of the protrusion 511 are slidable over the pair of inner side surfaces of the first recess 521, and therefore the first aligning member 51 and the second aligning member 52 are movable in the Z-axis direction relatively to each other while being restricted from rotating relatively to each other. Thus, when the ball screw 153 extending through the first aligning member 51 and the second aligning member 52 moves or inclines in the Z-axis direction, this positional shift is tolerated as the first aligning member 51 and the second aligning member 52 move relatively to each other.

A second recess 522 elongated in the Y-axis direction is formed in a front surface of the second aligning member 52. The through-hole 525 is located inside the second recess 522. The second recess 522 extends so as to pass through the central part of the second aligning member 52. A pair of inner side surfaces of the second recess 522 are plane surfaces parallel to the XY-plane. The base portion 384 of the shaft support part 138 is fitted in the second recess 522. The pair of outer side surfaces of the base portion 384 are slidable over the pair of inner side surfaces of the second recess 522, and therefore the second aligning member 52 and the shaft support part 138 are movable in the Y-axis direction relatively to each other while being restricted from rotating relatively to each other. Thus, when the ball screw 153 extending through the second aligning member 52 and the shaft support part 138 moves or inclines in the Y-axis direction, this positional shift is tolerated as the second aligning member 52 and the shaft support part 138 move relatively to each other.

The first washer 53 is disposed on an immediately front side of the shaft support part 138, and in this state, the front end of the ball screw 153 extends through the first washer 53. A front surface of the first washer 53 is a spherical surface that is convex toward the front side. The second washer 54 is disposed on an immediately front side of the first washer 53. A rear surface of the second washer 54 is a spherical surface that is convex toward the front side. As the front surface of the first washer and the rear surface of the second washer 54 slide over each other, a positional shift tolerated by the first aligning member 51, the second aligning member 52, and the shaft support part 138 can be absorbed. Thus, during assembly, the position of the shaft center of the ball screw 153 relative to the second nut 152 can be adjusted.

The nut 55 is fastened to an external thread formed at the front end of the ball screw 153. Specifically, the nut 55 is fastened to the external thread, and sandwiches other members (the second aligning member 52, the shaft support part 138, the first washer 53, and the second washer 54) between the nut 55 and the first aligning member 51 to thereby fix to the shaft support part 138 the ball screw 153 of which the position of the shaft center has been adjusted. Thus, once these parts are assembled, the position and the posture of the ball screw 153 are fixed.

As shown in FIG. 1 and FIG. 2, the impact absorbing member 180 is disposed so as to be interposed between the first moving unit 110 and the first screw mechanism 140, and can thereby absorb the impact of a collision of the driver with the operating member 101 (second collision) resulting from a collision between the vehicle and other object.

The impact absorbing member 180 is a metal member and has the engaging part 181, a mounting part 182, and a deforming part 183. Specifically, the engaging part 181 is a lower end part of the impact absorbing member 180, and is fixed to the first nut 142 while the sliding screw 143 extends through the engaging part 181. The mounting part 182 is an upper end part of the impact absorbing member 180, and is mounted and fixed on the box body 111 of the first moving unit 110. The deforming part 183 is a part that is provided between the engaging part 181 and the mounting part 182 and bent into a U-shape, and deforms in a second collision to absorb the impact energy. The deforming part 183 is provided, for example, such that the bent part (a bottom part of the U-shape) faces the front side.

As shown in FIG. 2, an energy absorption (EA) space 166 that is one example of a space for movement that allows the shaft member 118 to move frontward is formed inside the box body 111 of the first moving unit 110. In a second collision, the shaft member 118 moves frontward inside the EA space 166 while the impact absorbing member 180 deforms under a pressing force from the first moving unit 110. Thus, the impact energy of the second collision is absorbed and the driver's safety is secured. The length of the EA space 166 in the axial direction is determined based on, for example, the impact absorbing performance required of the steering device 100 and the properties of the impact absorbing member 180.

The technique for absorbing impact by the impact absorbing member 180 is not particularly limited. The impact absorbing member 180 may absorb impact using, instead of deformation of a single member, a shift (frictional force) between two members that are in contact with each other. Further, a resin member and the impact absorbing member 180 may be used in combination to absorb impact energy in two stages, first through breakage of the resin member and then through deformation of the metal impact absorbing member 180, etc. For example, a case is assumed where a resin pin that extends through the U-shaped impact absorbing member 180 (see FIG. 1) in the up-down direction is disposed on the impact absorbing member 180. In this case, when a second collision occurs, part of the impact energy is absorbed as the resin pin breaks, and subsequently the impact energy is further absorbed as the impact absorbing member 180 deforms.

As shown in FIG. 1 and FIG. 2, the driving unit 160 is a driving source that synchronously drives the first screw mechanism 140 and the second screw mechanism 150. The driving unit 160 is held by the frame 125. While the driving unit 160 is not particularly limited, in the case of this embodiment, an electric motor is used as the driving unit 160.

The transmission mechanism 170 is coupled to the first screw mechanism 140, the second screw mechanism 150, and the driving unit 160, and transmits driving force of the driving unit 160 to the first screw mechanism 140 and the second screw mechanism 150. Specifically, the transmission mechanism 170 is held by the frame 125. The transmission mechanism 170 is not particularly limited and may be any mechanism that can transmit driving force of the driving unit 160 to the sliding screw 143 of the first screw mechanism 140 and the second nut 152 of the second screw mechanism 150. A belt drive, a combination of gears, etc. can be arbitrarily adopted. In the case of this embodiment, a combination of gears is adopted.

Figures 8, 9:
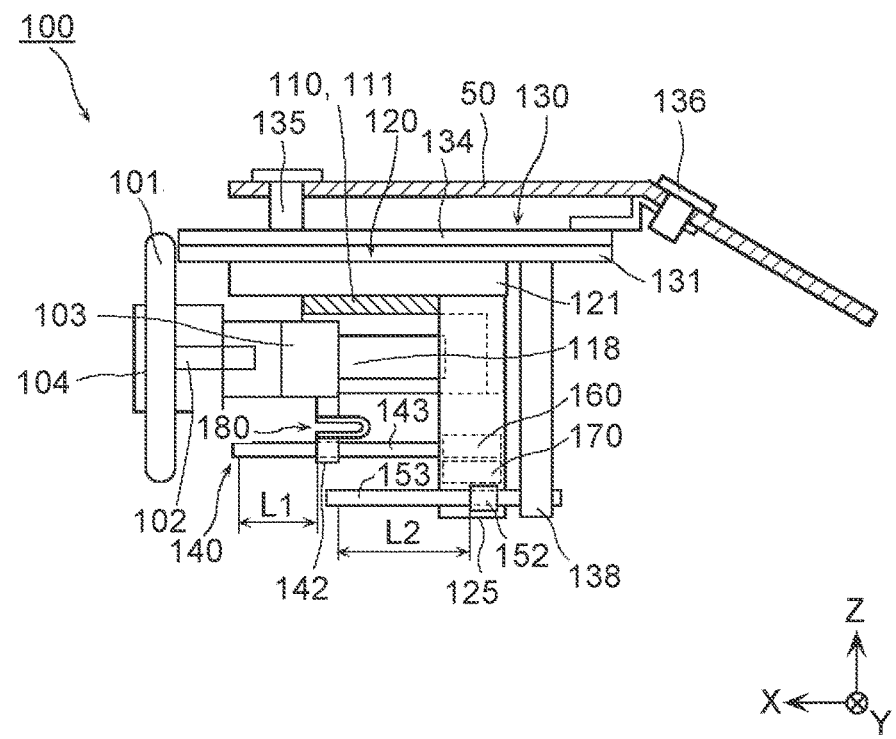
FIG. 8 is a view schematically showing the structure of the steering device according to the embodiment.
FIG. 9 is a block diagram showing the functional configuration of the steering device according to the embodiment.

Next, the operation of the parts when moving the operating member 101 between the operation region and the retraction region will be described. FIG. 8 is a view schematically showing the structure of the steering device 100 according to the embodiment. Specifically, FIG. 8 is a view corresponding to FIG. 2. FIG. 2 shows a state where the operating member 101 is disposed in the operation region, while FIG. 8 shows a state where the operating member 101 is disposed in the retraction region. Here, the operation region is a region in which the user can operate the operating member 101 to drive the vehicle, and which corresponds to the position of the operating member 101 when the first moving unit 110, the second moving unit 120, and the holding unit 130 have been extended. The retraction region is a region in which the operating member 101 is retracted during autonomous driving and the user's operation is not accepted, and which corresponds to the position of the operating member 101 when the first moving unit 110, the second moving unit 120, and the holding unit 130 have been contracted. For each of the operation region and the retraction region, a certain allowable range in the axial direction is provided.

In this embodiment, the rotation direction of the driving unit 160 that is an electric motor, the rotation direction of the sliding screw 143, and the rotation direction of the second nut 152 when the operating member 101 moves from the operation region to the retraction region will be referred to as a forward rotation direction. On the other hand, the rotation direction of the driving unit 160, the rotation direction of the sliding screw 143, and the rotation direction of the second nut 152 when the operating member 101 moves from the retraction region to the operation region will be referred to as a reverse rotation direction.

While the rotation directions of each part are termed as the "forward rotation direction" and the "reverse rotation direction" here, there may be a case where the forward rotation direction, for example, of one part is not the same direction as the forward rotation direction of another part. Specifically, the driving unit 160, the sliding screw 143, and the second nut 152 are coupled together through the transmission mechanism 170. Depending on the configuration of the transmission mechanism 170, a case may arise where at least one of the sliding screw 143 and the second nut 152 rotates in a direction reverse to the rotation direction of the driving unit 160. Also in this case, the rotation directions of each part will be referred to as the forward rotation direction. The same applies to the reverse rotation direction.

When the driving unit 160 that is an electric motor rotates in the forward direction in the state where the operating member 101 is disposed in the operation region as shown in FIG. 2, the sliding screw 143 of the first screw mechanism 140 is rotated in the forward direction through the transmission mechanism 170, and the second nut 152 of the second screw mechanism 150 is also rotated in the forward direction.

Thus, the first screw mechanism 140 operates in the forward direction as the rotational motion of the sliding screw 143 is converted into linear motion of the first nut 142. The first nut 142 moves in the X-axis minus direction along the sliding screw 143, so that the first moving unit 110 also moves in the X-axis minus direction, closer to the second moving unit 120.

Meanwhile, the second screw mechanism 150 operates in the forward direction as the rotational motion of the second nut 152 is converted into linear motion of the ball screw 153. The ball screw 153 moves in the X-axis plus direction relatively to the second nut 152, so that the second moving unit 120 moves closer to the holding unit 130.

As a result, the first moving unit 110, the second moving unit 120, and the holding unit 130 are contracted and the operating member 101 is disposed in the retraction region as shown in FIG. 8. When the operating member 101 is disposed in the retraction region, the space in front of the driver is expanded, which improves, for example, the driver's comfort.

Next, when the driving unit 160 that is an electric motor rotates in the reverse direction in a state where the operating member 101 is disposed in the retraction region, the sliding screw 143 of the first screw mechanism 140 is rotated in the reverse direction through the transmission mechanism 170, and the second nut 152 of the second screw mechanism 150 is also rotated in the reverse direction.

Thus, the first screw mechanism 140 operates in the forward direction as the rotational motion of the sliding screw 143 is converted into linear motion of the first nut 142. The first nut 142 moves in the X-axis plus direction along the sliding screw 143, so that the first moving unit 110 also moves in the X-axis plus direction, farther away from the second moving unit 120.

Meanwhile, the second screw mechanism 150 operates in the forward direction as the rotational motion of the second nut 152 is converted into linear motion of the ball screw 153. The ball screw 153 moves in the X-axis minus direction relatively to the second nut 152, so that the second moving unit 120 moves farther away from the holding unit 130.

As a result, the first moving unit 110, the second moving unit 120, and the holding unit 130 are extended and the operating member 101 is disposed in the operation region as shown in FIG. 2. In the operation region, it is also possible to adjust the position of the operating member 101 by controlling forward rotation and reverse rotation of the driving unit 160. Specifically, the driver can change the position of the operating member 101 in the front-rear direction as he or she intends. Thus, the driver can adjust the position of the operating member 101 to a position according to his or her body shape, preference, etc.

As has been described, each of the first screw mechanism 140 and the second screw mechanism 150 is provided so as to operate in the forward direction when the operating member 101 moves between the retraction region and the operation region.

In FIG. 8, the respective amounts of movement of the first screw mechanism 140 and the second screw mechanism 150 are denoted by L1 and L2. The amount of movement L1 of the first screw mechanism 140 refers to a relative movable range of the first nut 142 relative to the sliding screw 143. The amount of movement L2 of the second screw mechanism 150 refers to a relative movable range of the ball screw 153 relative to the second nut 152. When the first screw mechanism 140 and the second screw mechanism 150 are synchronously driven by the driving unit 160 such that the operating member 101 moves from the operation region to the retraction region (retraction action) or from the retraction region to the operation region (deployment action), the amount of movement L2 of the second screw mechanism 150 is larger than the amount of movement L1 of the first screw mechanism 140.

Specifically, the amount of movement L2 is made larger than the amount of movement L1 by, for example, setting the forward efficiency of the second screw mechanism 150 higher than the forward efficiency of the first screw mechanism 140. Here, forward efficiency is the ratio of an output to an input when converting rotational motion into linear motion. Specifically, the forward efficiency of the first screw mechanism 140 is the ratio of an output to an input when rotating the sliding screw 143 to linearly move the first nut 142. The forward efficiency of the second screw mechanism 150 is the ratio of an output to an input when rotating the second nut 152 to linearly move the ball screw 153. The forward efficiency can be adjusted by adjusting the lead, lead angle, forward friction angle, coefficient of static friction, etc. of each of the first screw mechanism 140 and the second screw mechanism 150.

As has been described, the amount of movement L2 of the second screw mechanism 150 is larger, and the forward efficiency thereof is higher, than the amount of movement L1 and the forward efficiency of the first screw mechanism 140. Therefore, even when the first screw mechanism 140 and the second screw mechanism 150 of which the amount of movement L1 is smaller than the amount of movement L2 are synchronously driven by the driving unit 160, the first nut 142 and the ball screw 153 can be moved at the same timing and their movement can be completed at the same timing.

That the forward efficiency is high can be rephrased as that the speed reduction ratio is low or that the lead is large. Since the first screw mechanism 140 and the second screw mechanism 150 differ from each other in the efficiency (the speed reduction ratio or the lead), when the first screw mechanism 140 and the second screw mechanism 150 are synchronously driven, movement of the first screw mechanism 140 and movement of the second screw mechanism 150 that differ from each other in the amount of movement can be completed at the same timing.

The reverse efficiency of the first screw mechanism 140 is set such that when the operating member 101 is subjected to an external force F1 directed toward the retraction region, the first screw mechanism 140 does not operate in the reverse direction due to the external force F1. Specifically, the external force F1 can be set, for example, as a force that is applied to the operating member 101 as a human pushes or pulls the operating member 101. The external force F1 can also be set as a force that is applied to the operating member 101 in a second collision. Here, reverse efficiency is the ratio of an output to an input when converting linear motion into rotational motion. Specifically, the reverse efficiency of the first screw mechanism 140 is the ratio of an output to an input when linearly moving the first nut 142 to rotate the sliding screw 143. The reverse efficiency can be adjusted by adjusting the lead, lead angle, reverse friction angle, reverse friction coefficient, etc. of the first screw mechanism 140.

It is assumed that the external force F1 directed toward the retraction region is applied to the operating member 101 as shown in FIG. 2. Since the reverse efficiency of the first screw mechanism 140 is set such that the first screw mechanism 140 does not operate in the reverse direction under the external force F1, the linear motion of the first nut 142 relative to the sliding screw 143 is restricted. Thus, the movement of the first moving unit 110 in the axial direction relative to the second moving unit 120 is also restricted.

Meanwhile, the external force F1 also acts on the second moving unit 120 through the first moving unit 110. Here, the second screw mechanism 150 has high reverse efficiency by employing the ball screw 153. Therefore, the ball screw 153 may be moved linearly through the second nut 152 due to the external force F1. The second nut 152 is coupled to the sliding screw 143 of the first screw mechanism 140 through the transmission mechanism 170. Since the reverse efficiency of the first screw mechanism 140 is set such that the first screw mechanism 140 does not operate in the reverse direction as described above, the sliding screw 143 is restricted form rotating even under the external force F1. Thus, the transmission mechanism 170 coupled to the sliding screw 143 that is restricted from rotating is also restricted from moving, so that the second nut 152 coupled to the transmission mechanism 170 is also restricted from rotating. In the second screw mechanism 150, therefore, the ball screw 153 is restricted from moving linearly relatively to the second nut 152.

This restriction is affected by a frictional force between the first nut 142 and the sliding screw 143. The frictional force is generated as the tooth flank of the first nut 142 is pressed against the tooth flank of the sliding screw 143 when a reverse input F2 acts on the first nut 142 due to the external force F1. If a force F3 with which the second nut 152 tries to rotate becomes larger than this frictional force, the restriction on the second nut 152 is removed and the second screw mechanism 150 operates in the reverse direction. It is desirable that the gear specifications of the first screw mechanism 140 be set such that the second screw mechanism 150 does not operate in the reverse direction also in a second collision in which an excessive force F3 can occur.

The steering device 100 may further include a tilting mechanism that changes the inclination of the operating member 101 in the up-down direction. The tilting mechanism changes the inclination of the operating member 101 in the up-down direction by, for example, turning the first moving unit 110 around an axis parallel to the left-right direction (the Y-axis direction in FIG. 1). Thus, for example, the position of the operating member 101 in the up-down direction can be adjusted according to the driver's intention. The tilting mechanism may be configured to change the inclination of the operating member 101 in the up-down direction by turning the second moving unit 120 around an axis parallel to the left-right direction (the Y-axis direction in FIG. 1).

The operation of the driving unit 160 having been described above is controlled by a control unit 190 (see FIG. 9) of the steering device 100. FIG. 9 is a block diagram showing the functional configuration of the steering device 100 according to the embodiment.

The control unit 190 acquires various pieces of information and controls the driving unit 160 etc. based on the acquired information. For example, the control unit 190 acquires a predetermined command given by the driver's predetermined operation or detection results of various sensors. The control unit 190 moves the operating member 101 in the axial direction by controlling the driving unit 160 based on the acquired predetermined command or detection results. The control unit 190 acquires, as needed, information showing the positions of the first moving unit 110 and the second moving unit 120 from the driving unit 160. Thus, the control unit 190 can recognize, as needed, the position of the operating member 101 that is indirectly supported on the first moving unit 110, relative to a predetermined reference.

The control unit 190 performing the above control is realized by, for example, a computer including a central processing unit (CPU), a storage device, such as a memory, an interface for inputting and outputting information, etc. For example, as the CPU executes a predetermined program stored in the storage device, the control unit 190 can control the operation of the steering device 100 according to control signals sent from a superordinate control unit 300 or the like, detection results of sensors, etc.

The airbag 200 housed in the airbag housing part 104 of the steering device 100 is activated according to a command from an airbag control unit 210 installed in the vehicle. The airbag control unit 210 determines whether to deploy the airbag 200 based on, for example, acceleration information received from an acceleration sensor 250. When there is a rapid change in the acceleration rate that is equal to or larger than a threshold value, such as when the vehicle collides with some object, the airbag control unit 210 gives a deployment command to the airbag 200, and the airbag 200 deploys as the inflator is activated. Thus, the airbag 200 inflates instantly.

As described above, the airbag 200 basically inflates when a collision between the vehicle and other object occurs. However, if the airbag housing part 104 recedes along with the operating member 101 to a position far away from the driver, the airbag 200 cannot be expected to achieve a sufficient impact absorbing function, due to factors such as the long distance between the airbag 200 and the driver and the dashboard being located near the airbag 200. Simply put, the airbag 200 fails to fulfil its intended function. Therefore, according to the position of the operating member 101, the airbag housing part 104, or the like acquired from the steering device 100, the superordinate control unit 300 performs, for example, control of prohibiting the airbag control unit 210 from deploying the airbag 200. In this case, the driver's safety is secured by other airbags etc. (not shown) that are disposed at positions other than on the front side of the driver's seat (e.g., in the ceiling).

In the event of a collision, an excessive force F3 can occur. Even when the reverse efficiency of the first screw mechanism 140 is set such that the second screw mechanism 150 does not operate in the reverse direction in the event of a collision as described above, it is possible that this setting may not work in all situations. Therefore, when an excessive reverse input into the first screw mechanism 140 or the second screw mechanism 150 is detected, the control unit 190 controls the driving unit 160 so as to restrict reverse operation. Specifically, the control unit 190 rotates the driving unit 160 in a direction reverse to the rotation direction of reverse operation, or stops the rotation of the driving unit 160 itself. Thus, reverse operation can be reliably restricted.

To detect an excessive reverse input, a sensor that directly detects the reverse input may be provided. Alternatively, the control unit 190 may infer a collision based on acceleration information received from the acceleration sensor 250 and thereby detect an excessive reverse input. Further, the control unit 190 may detect an excessive reverse input based on a sudden increase in the load on the driving unit 160. Thus, any configuration may be adopted that allows detection of an excessive reverse input into the first screw mechanism 140 or the second screw mechanism 150.

As has been described above, in this embodiment, the first screw mechanism 140 is provided so as to operate in the forward direction when the operating member 101 moves between the retraction region and the operation region, and the reverse efficiency of the first screw mechanism 140 is set such that when the operating member 101 is subjected to an external force F1 directed toward the retraction region, the first screw mechanism 140 does not operate in the reverse direction due to the external force F1. Thus, even when the operating member 101 is subjected to the external force F1, the first screw mechanism 140 does not convert linear motion attributable to the external force F1 into rotational motion. As a result, the movement of the first moving unit 110 is restricted.

The second screw mechanism 150 is coupled to the first screw mechanism 140 through the transmission mechanism 170. Since the reverse efficiency of the first screw mechanism 140 is set such that the first screw mechanism 140 does not operate in the reverse direction, the first screw mechanism 140 is restricted from rotating under the external force F1. Therefore, the transmission mechanism 170 coupled to the first screw mechanism 140 that is restricted from rotating is also restricted from moving, so that the second screw mechanism 150 coupled to the transmission mechanism 170 is also restricted from rotating. Thus, the second screw mechanism 150 is also restricted from moving linearly, i.e., the second moving unit 120 is restricted from moving. As has been described, simply setting the reverse efficiency of the first screw mechanism 140 can restrict the first moving unit 110 and the second moving unit 120 from moving due to the external force F1. This means that the first screw mechanism 140 can function as a lock mechanism. Therefore, without being provided with a dedicated lock mechanism, the steering device 100 can restrict the first moving unit 110 and the second moving unit 120 from moving due to the external force F1. Compared with when a dedicated lock mechanism is provided, the total number of parts can be reduced, the size of the device can be kept down, and the efficiency of installing the device in a vehicle can be increased.

Here, the second screw mechanism 150 can also function as a lock mechanism. In this case, the reverse efficiency of the second screw mechanism 150 is set such that when the operating member 101 is subjected to the external force F1, the second screw mechanism 150 does not operate in the reverse direction due to the external force F1. However, the second screw mechanism 150 is disposed on the front side of the vehicle relatively to the first screw mechanism 140, and is disposed at a position farther away from the side where the external force F1 is input. For this reason, reliably restricting the operation of the first screw mechanism 140 may involve complicating the structure of the transmission mechanism 170 (increasing the number of gears). This complication is likely to lead to creation of backlash, a decrease in the rigidity, degradation of the lock function, etc. In contrast, making the first screw mechanism 140 function as a lock mechanism as described above does not complicate the structure of the transmission mechanism 170 and is therefore preferable.

Since the amount of movement L2 of the second screw mechanism 150 is larger than the amount of movement L1 of the first screw mechanism 140, the amount of movement of the operating member 101 can be increased by increasing only the amount of movement L2 of the second screw mechanism 150.

Here, if the amount of movement L1 of the first screw mechanism 140 is large, when the parts are extended (when the operating member 101 is disposed in the operation region), there is a long distance between the first moving unit 110 and the holding unit 130, which causes a decrease in the rigidity of the steering device 100 as a whole. Moreover, as the moment applied to the first moving unit 110 increases, the influence of the decrease in the rigidity of the steering device 100 as a whole is significant. In this embodiment, however, the amount of movement L1 of the first screw mechanism 140 is smaller than the amount of movement L2 of the second screw mechanism 150, so that a decrease in the rigidity of the steering device 100 as a whole can be avoided.

Since the forward efficiency of the second screw mechanism 150 is higher than the forward efficiency of the first screw mechanism 140, even when the first screw mechanism 140 and the second screw mechanism 150 of which the amount of movement L1 is smaller than the amount of movement L2 are synchronously driven by the driving unit 160, the first nut 142 and the ball screw 153 can be moved at the same timing as well as their movement can be completed at the same timing.

This makes it possible to avoid a decrease in the rigidity of the device itself while increasing the amount of movement of the operating member 101.

Since the ball screw 153 of the second screw mechanism 150 that has a larger amount of movement is fixed to the holding unit 130 supported on the vehicle body 50, the rigidity of the steering device 100 can be further enhanced.

The position of the shaft center of the ball screw 153 relative to the second nut 152 can be adjusted by the aligning mechanism 154, and therefore the position of the shaft center of the ball screw 153 can be adjusted during assembly. The rotational motion of the second nut 152 relative to the ball screw 153 can be thereby smoothed.

Since the backlash reducing mechanism 144 reduces backlash of the first nut 142 relative to the sliding screw 143, creation of backlash or an increase in torque between the sliding screw 143 and the first nut 142 can be avoided. The rotational motion of the sliding screw 143 relative to the first nut 142 can be thereby smoothed.

Since the second fixing part 136 is disposed on the front side relative to the first fixing part 135 and has a higher impact-absorbing property than the first fixing part 135, when a collision of the front side of the vehicle occurs, the impact of the collision can be absorbed by the second fixing part 136. The impact can be absorbed as the fragile portion of the second fixing part 136 deforms.

The impact absorbing member 180 connected to the first moving unit 110 absorbs impact as the front end of at least one of the shaft member 118 and the first moving unit 110 moves in the axial direction toward the front side. Here, the holding unit 130 holds not only the second moving unit 120 but also the first moving unit 110 through the second moving unit 120, and is therefore required to have certain rigidity. In this embodiment, the impact absorbing member 180 is connected to the first moving unit 110. Thus, compared with when the impact absorbing member 180 is connected to the holding unit 130, a decrease in the rigidity of the holding unit 130 can be avoided.

When an excessive reverse input into the first screw mechanism 140 or the second screw mechanism 150 is detected, the control unit 190 controls the driving unit 160 so as to restrict reverse operation. Thus, when a situation arises where mechanical limitation alone cannot eliminate the possibility of reverse operation, the control unit 190 can control the operation of the driving unit 160 so as to reliably restrict reverse operation.

Since the guide mechanism 121 guides the movement of the first moving unit 110 relative to the second moving unit 120, the first moving unit 110 can move smoothly.

Other Embodiments

The steering device according to the present disclosure has been described above based on the embodiment. However, the present disclosure is not limited to the above embodiment. Embodiments incorporating various changes to the above embodiment conceived by those skilled in the art, and embodiments established by combining some of the constituent elements described above, unless departing from the gist of the present disclosure, are also included in the scope of the present disclosure.

For example, the external appearance and the configuration of the steering device 100 shown in FIG. 1 are examples, and the shape, size, and position of each constituent element are not limited to the shape, size, and position shown in FIG. 1. The configuration of each constituent element need not be the configuration shown in FIG. 1 etc., either.

In the above embodiment, the case has been illustrated in which the driving unit 160 is a single electric motor, and this electric motor is coupled to the first screw mechanism 140 and the second screw mechanism 150 through the transmission mechanism 170. However, the driving unit may have two electric motors if it can synchronously drive the first screw mechanism 140 and the second screw mechanism 150. Specifically, one of the electric motors is coupled to the sliding screw 143 of the first screw mechanism 140, while the other electric motor is coupled to the second nut 152 of the second screw mechanism 150. In this case, it is also possible to omit the transmission mechanism 170.

When the transmission mechanism 170 is omitted, the reverse efficiency of each of the first screw mechanism 140 and the second screw mechanism 150 may be set such that the screw mechanism does not operate in the reverse direction due to the external force F1. In this aspect, the steering device 100 includes: the first moving unit 110 that moves in the axial direction of the shaft member 118 having the operating member 101 connected at the rear end, along with the shaft member 118, and rotatably supports the shaft member 118; the second moving unit 120 that holds the first moving unit 110 so as to be movable in the axial direction; the holding unit 130 that holds the second moving unit 120 so as to be movable in the axial direction; the first screw mechanism 140 that is disposed between the first moving unit 110 and the second moving unit 120 and moves the first moving unit 110 in the axial direction; the second screw mechanism 150 that is disposed between the second moving unit 120 and the holding unit 130 and moves the second moving unit 120 in the axial direction; a first driving unit 160a (see FIG. 10) that outputs driving force for driving the first screw mechanism 140; and a second driving unit 160b (see FIG. 10) that outputs driving force for driving the second screw mechanism 150.

Figure 10:
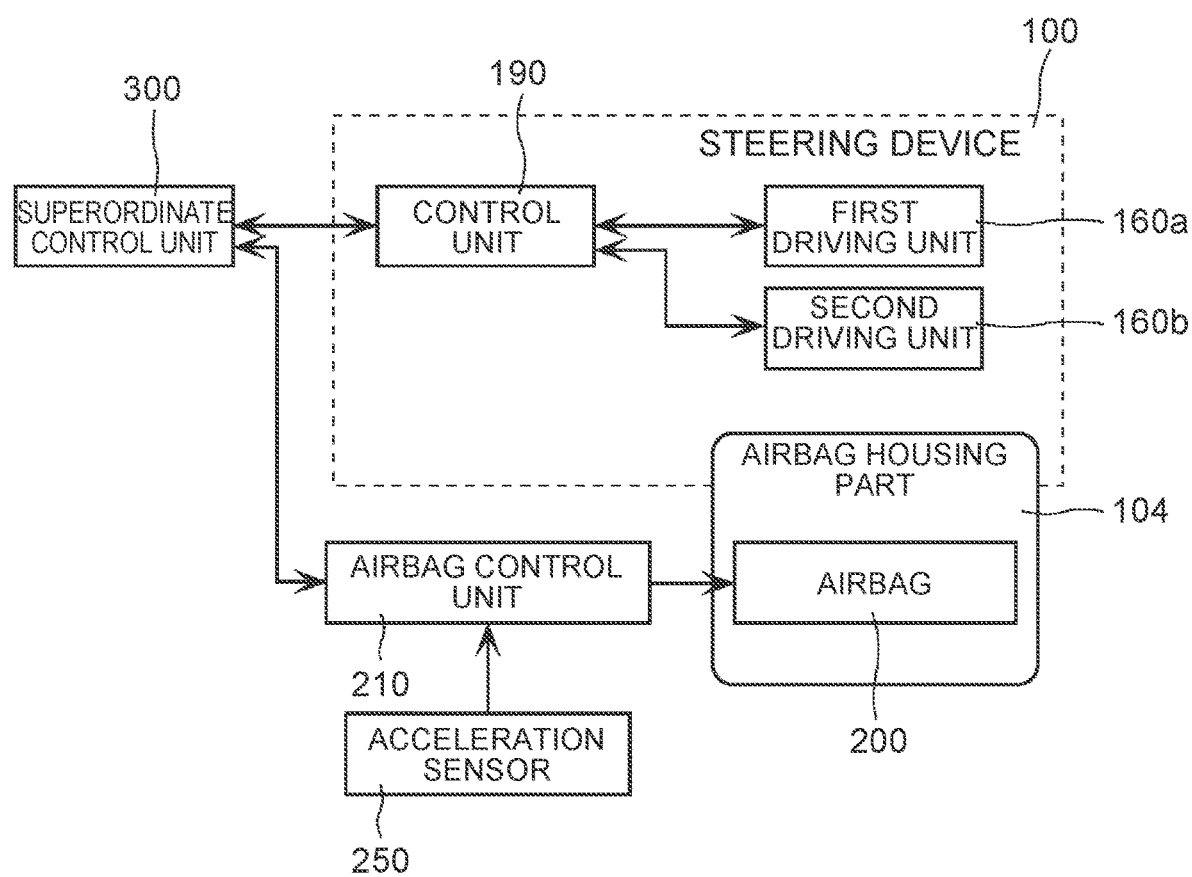
FIG. 10 is a block diagram showing the functional configuration of a steering device according to a modified example.

FIG. 10 is a block diagram showing the functional configuration of the steering device 100 according to a modified example. As shown in FIG. 10, the first driving unit 160a and the second driving unit 160b are electrically connected to the control unit 190. The first driving unit 160a is coupled so as to be able to output driving force only to the first screw mechanism 140. The second driving unit 160b is coupled so as to be able to output driving force only to the second screw mechanism 150. The control unit 190 acquires various pieces of information and controls the first driving unit 160a and the second driving unit 160b based on the acquired information.

Each of the first screw mechanism 140 and the second screw mechanism 150 is provided so as to operate in the forward direction when the operating member 101 moves between the retraction region and the operation region, and the reverse efficiency of each of the first screw mechanism 140 and the second screw mechanism 150 is set such that when the operating member 101 is subjected to the external force F1 directed toward the retraction region, the screw mechanism does not operate in the reverse direction due to the external force F1. Thus, the steering device 100 from which the transmission mechanism is omitted can also fulfil a certain lock function.

In the above embodiment, the case has been illustrated in which the posture of the first nut 142 is stabilized by the pair of bushes 175 and the plunger 176. However, the steering device may be provided with only either the pair of bushes 175 or the plunger 176. Also in this case, the posture of the first nut 142 can be stabilized to some degree, and a certain backlash reducing effect can be exerted on the first nut 142.

The present disclosure is useful as a steering device that can expand a space in front of a driver as well as enhance the collision safety. Therefore, the present disclosure is applicable to vehicles, such as automobiles, buses, trucks, agricultural machines, and construction machines, that are equipped with wheels, caterpillar tracks, or the like and capable of manual driving as well as autonomous driving.

What is claimed is:

1. A steering device comprising:
   an operating member that steers a vehicle;
   a first moving unit that (i) moves in an axial direction of
      a shaft member having the operating member connected at a rear end, along with the shaft member, and (ii) rotatably supports the shaft member;

a second moving unit that holds the first moving unit so as to be movable in the axial direction;

a holding unit that holds the second moving unit so as to be movable in the axial direction;

a first screw mechanism that is disposed between the first moving unit and the second moving unit and moves the first moving unit in the axial direction;

a second screw mechanism that is disposed between the second moving unit and the holding unit and moves the second moving unit in the axial direction;

a driving unit that outputs driving force for driving the first screw mechanism and the second screw mechanism; and a transmission mechanism that is coupled to the first screw mechanism, the second screw mechanism, and the driving unit and transmits driving force of the driving unit to the first screw mechanism and the second screw mechanism, wherein:

the steering device moves the operating member between an operation region and a retraction region;

the first screw mechanism is provided so as to operate in a forward direction when the operating member moves between the retraction region and the operation region, and reverse efficiency of the first screw mechanism is set such that, when the operating member is subjected to an external force directed toward the retraction region, the first screw mechanism does not operate in a reverse direction due to the external force;

the first screw mechanism has a first nut that is fixed to the first moving unit, and the first screw mechanism has a sliding screw that screws into the first nut in a state of extending in the axial direction and is rotated by the driving unit through the transmission mechanism; and the second screw mechanism has a second nut that is rotated by the driving unit through the transmission mechanism, and the second screw mechanism has a ball screw that screws into the second nut and is fixed on the holding unit so as to extend in the axial direction relatively to the holding unit.

2. The steering device according to claim 1, wherein the second screw mechanism includes an aligning mechanism that adjusts a position of a shaft center of the ball screw relative to the second nut.

3. The steering device according to claim 1, wherein the first screw mechanism includes a backlash reducing mechanism that reduces backlash of the first nut relative to the sliding screw.

4. The steering device according to claim 1, further comprising a control unit that controls the driving unit, wherein, when an excessive reverse input into the first screw mechanism or the second screw mechanism is detected, the control unit controls the driving unit so as to restrict the reverse operation.

5. The steering device according to claim 1, further comprising an impact absorbing member that is connected to the first moving unit and absorbs impact as a front end of at least one of the shaft member and the first moving unit moves in the axial direction toward a front side.

6. The steering device according to claim 1, wherein the second screw mechanism has a larger amount of movement and higher forward efficiency than the first screw mechanism.

7. The steering device according to claim 1, wherein the second moving unit has a guide mechanism that guides movement of the first moving unit relative to the second moving unit.

8. The steering device according to claim 1, wherein:
the holding unit has a first fixing part and a second fixing part that are fixed to a vehicle body; and
the second fixing part is disposed on a front side of the vehicle relatively to the first fixing part and has a higher impact-absorbing property than the first fixing part.

* * * * *